(12) United States Patent
Mora

(10) Patent No.: US 11,166,019 B2
(45) Date of Patent: Nov. 2, 2021

(54) SPATIO-TEMPORAL DENOISING OF VIDEO CONTENT BASED ON CONFIDENCE INDEXES

(71) Applicant: ATEME, Velizy Villacoublay (FR)

(72) Inventor: Elie Mora, Paris (FR)

(73) Assignee: ATEME, Velizy Villacoublay (FR)

( * ) Notice: Subject to any disclaimer, the term of this patent is extended or adjusted under 35 U.S.C. 154(b) by 0 days.

(21) Appl. No.: 16/507,606

(22) Filed: Jul. 10, 2019

(65) Prior Publication Data

US 2020/0021808 A1 Jan. 16, 2020

(30) Foreign Application Priority Data

Jul. 10, 2018 (FR) .................... 18 56349

(51) Int. Cl.
*H04N 19/117* (2014.01)
*H04N 19/139* (2014.01)
(Continued)

(52) U.S. Cl.
CPC ............ *H04N 19/117* (2014.11); *G06T 5/002* (2013.01); *G06T 5/50* (2013.01); *H04N 19/139* (2014.11);
(Continued)

(58) Field of Classification Search
CPC .. H04N 19/117; H04N 19/139; H04N 19/154; H04N 19/172; H04N 19/196;
(Continued)

(56) References Cited

U.S. PATENT DOCUMENTS 6,178,205 B1 1/2001 Cheung et al.
6,281,942 B1 8/2001 Wang
(Continued)

OTHER PUBLICATIONS

Preliminary Search Report and Written Opinion in priority French Patent Application No. 18 56349, dated May 2, 2019 (7 pages).
(Continued)

*Primary Examiner* — Jae N Noh
(74) *Attorney, Agent, or Firm* — Faegre Drinker Biddle & Reath LLP

(57) ABSTRACT

The disclosure relates to a method for processing the noise of a stream comprising a series of images, comprising spatial filtering of a current image $I_n$ in order to obtain a spatially filtered image $S_n$; determining a motion vector for each block B of pixels of the image $S_n$, from a single image $S_{n-1}$; calculating a confidence index $\alpha_n[B]$ for each block B of image $I_n$, from the motion vector determined for B; constructing a temporal filter from the calculated confidence indices $\alpha_n[B]$ and applying the temporal filter to the current image $I_n$ in order to obtain a temporally filtered image $T_n$; spatial filtering of the current image $I_n$ in order to obtain a spatially filtered image $D_n$ where $D_n$ can be equal to $S_n$, and obtaining a temporally and spatially filtered image $R_n$ by applying a function combining image $T_n$ and image $D_n$.

9 Claims, 6 Drawing Sheets

(51) Int. Cl.
*H04N 19/154* (2014.01)
*H04N 19/172* (2014.01)
*H04N 19/196* (2014.01)
*H04N 19/80* (2014.01)
*G06T 5/00* (2006.01)
*G06T 5/50* (2006.01)

(52) U.S. Cl.
CPC ......... *H04N 19/154* (2014.11); *H04N 19/172* (2014.11); *H04N 19/196* (2014.11); *H04N 19/80* (2014.11); *G06T 2207/10016* (2013.01); *G06T 2207/20182* (2013.01)

(58) Field of Classification Search
CPC ........... H04N 19/80; G06T 5/002; G06T 5/50; G06T 2207/10016; G06T 2207/20182
USPC ...................................................... 375/240.2
See application file for complete search history.

(56) References Cited

U.S. PATENT DOCUMENTS

| | | |
|---|---|---|
| 2009/0278945 A1 | 11/2009 | Lin |
| 2009/0323808 A1 | 12/2009 | Lin |
| 2010/0220939 A1 | 9/2010 | Tourapis et al. |
| 2014/0247888 A1* | 9/2014 | Tourapis ............... H04N 19/132 375/240.26 |
| 2017/0084007 A1* | 3/2017 | Rakhshanfar ............ H04N 5/21 |

OTHER PUBLICATIONS

Balakhnin, "FFT3DFilter," Plugin for Avisynth 2.5, Version 2.1.1., 2004-2007, retrieved from Internet: http://avisynth.org.ru/fft3dfilter/fft3dfilter.html on Jun. 8, 2021, 8 pages.

Cheong et al., "Adaptive Spatio-Temporal Filtering for Video Denoising," 2004 IEEE International Conference on Image Processing (ICIP), IEEE, 2004, pp. 965-968.

* cited by examiner

SPATIO-TEMPORAL DENOISING OF VIDEO CONTENT BASED ON CONFIDENCE INDEXES

CROSS-REFERENCE TO RELATED APPLICATION

This application claims priority benefit under 35 U.S.C. § 119(d) from French Patent Application No. 18 56349 filed Jul. 10, 2018, the entire content of which is incorporated herein by reference.

FIELD

The present disclosure is in the field of image and video processing, more specifically in the field of processing digital noise in images and videos. The disclosure relates to a method for processing digital noise in a digital video stream, called "denoising".

BACKGROUND

Digital images and videos presented in the form of digital data contain unwanted information. This unwanted information is not related to the original image or video. When transmitting a digital signal, this unwanted information is transported. In the field of signal processing, this unwanted information is called digital noise. In the case of an image or a video, this digital noise appears in the form of random details. These random details add to the details of the photographed scene or the filmed sequence. The presence of digital noise affects the visual quality of a digital image or video. Indeed, in most cases it is considered that the greater the presence of digital noise, the more the visual quality is degraded. However, the presence of digital noise may sometimes be desirable, for example film grain can add realism to video content.

In addition to the fact that the presence of digital noise degrades the quality of a digital image or video, the presence of digital noise increases the complexity required for the processing that corresponds to the encoding of a digital image or video.

SUMMARY

In the field of signal processing, several types of digital noise exist. For example, thermal noise may be related to the temperature of the sensor used, while the noise commonly called "salt and pepper" noise may be due to data transmission errors. The processing used to reduce or eliminate the noise of an image or video is called "denoising". Therefore, in the following description of the present disclosure, the terms "processing", "filtering", and "denoising" are used with identical meaning. For this purpose, denoiser or type of processing is understood to mean a filter used to perform the denoising, filtering, or processing, namely to reduce or eliminate the noise present in a digital image or video.

A denoiser may be spatial, temporal, or spatio-temporal. The terminology that can be used is therefore: denoising spatial filtering of an image and denoising temporal filtering of an image. The result obtained is a spatially filtered image in the case of denoising spatial filtering of an image. When an image is spatially filtered, the filter uses only the image data. In the case of denoising temporal filtering of an image, the result is a temporally filtered image. When a spatio-temporal filter is used, the result obtained is a spatially and temporally filtered image. Unlike spatial filtering, temporal filtering uses the data of past and/or future images relative to the image to be filtered, called the current image and denoted In in the following. To filter a temporally current image In, a temporal filter can then use the data comprised in images In and In−1 for example. Since noise is a random signal with little spatial correlation, and no temporal correlation, the use of past and/or future images to denoise the current image increases the effectiveness of the denoising.

In the field of image and video processing, the use of spatio-temporal filters is common. The use of such filters offers significant advantages. Firstly, a spatio-temporal filter makes it possible to filter a video spatially and temporally and to combine the results of the two filterings in an advantageous manner. During the motion estimation performed for temporal filtering, several errors may appear. The motion estimation may be erroneous due to a change of scene, a movement that is not a translation, or a change in brightness for example. Therefore, it is necessary to put mechanisms into place to protect against these motion estimation errors. For temporal filtering, when the motion estimation error is minimized, the efficiency of the filtering is a function of the number of images considered. In other words, the more a temporal filter takes into account the images preceding and following a current image In, the greater the effectiveness of the temporal filter.

Several works concerning protection mechanisms implemented to avoid erroneous motion estimations are proposed in the literature. In general, the number of images used for filtering a current image (past or future images) is limited. This is to avoid significantly increasing the complexity of the filtering operation. FIG. 1 represents a noisy original image. The image in FIG. 1 shows several buildings as well as an animal statue. As indicated above, the noise present in an image as is shown in FIG. 1 is an undesirable element. Temporal filtering provides high effectiveness. As the noise is not temporally correlated, the use of a temporal filter can be an effective solution for noise processing. Indeed, the noise in question is often an additive white noise with a zero mean. Thus we have:

$S_i$ representing a noisy signal from a digital video stream
$V_i$ representing a non-noisy signal from the same noisy digital video stream
$B_i$ representing the noise in a given image "i"
i representing a natural number If we consider the noise to be additive white noise with zero mean, then we have the following relation:

$$S_i = V_i + B_i$$

When the underlying video signal is constant from one image to another, in other words there is no motion, then the signal Vi does not vary from one image to another. Therefore for every pair (i, j) of natural numbers where i is different from j, we have the following relation:

$$V_i = V_j = v$$

When averaging the noisy signals coming from a digital video stream from image 0 to N−1 (N denoting a non-zero natural number), we obtain the following relation:

$$M_N = \frac{\sum_{i=0}^{N-1} S_i}{N} = \frac{\sum_{i=0}^{N-1} V_i + B_i}{N} = \frac{N * v + \sum_{i=0}^{N-1} B_i}{N} = v + \frac{\sum_{i=0}^{N-1} b_i}{N}$$

$M_N$ representing the mean of the noisy signals Si coming from a digital video stream The noise has a zero mean, however. We therefore have the following relation:

$$\lim_{N \to \infty} \frac{\sum_{i=0}^{N-1} B_i}{N} = 0$$

As a result, by passing to the limit in the expression of the mean we obtain the following equality:

$$\lim_{N \to \infty} M_N = \lim_{N \to \infty} \frac{\sum_{i=0}^{N-1} S_i}{N} = \lim_{N \to \infty} v + \frac{\sum_{i=0}^{N-1} b_i}{N} = v$$

Therefore, when the temporally noisy video signal (noisy signal Si from a digital video stream) is averaged several times, we find the underlying non-noisy video signal (non-noisy signal Vi coming from the same noisy digital video stream).

However, it is rare that a video sequence does not include motion. Therefore, it is necessary to be able to characterize the motion and estimate it. We then use a method known as Motion Estimation. Such a method makes it possible to study the displacement of objects in a video sequence, by determining the correlation between two successive images In and In+1 or In−1 and In, where n is a natural number, in order to estimate motion in the video content.

FIG. 2 shows the use of a motion estimation method for a translational movement. The images of FIG. 2, from right to left respectively In−1, In and In+1, represent the displacement of a star from picture to picture. An estimate of translational movement as shown in FIG. 2 makes it possible to determine the position of an object in a past frame and a future frame. The path of the star's position from image In−1 to image In+1 is represented by vectors: a first vector representing the displacement of the star from image In−1 to image In, a second vector representing the displacement of the star from image In to image In+1. The dots represented around and on the star in each image In−1, In and In+1 represent the noise present in each image. It is easy to see that the noise differs from one image to another. Indeed, the distribution of the noise present in images In−1, In and In+1 is different. However, as indicated in FIG. 2, we note that when we perform a temporal average of images In−1, In and In+1, we then find a noiseless image. However, this operation is only possible in the case where the motion estimation is perfect. In fact, in general, several parameters influence the motion estimation, thus preventing a complete motion estimation. The following parameters can affect motion estimation within a video sequence: a change in brightness, a change of scene, a movement that is not exactly translational. Therefore, it is necessary to be able to determine when the content differs from one image to another in order to avoid performing an averaging operation on a series of images with different content.

FIG. 3 shows an example of duplicate edges. The images in FIG. 3 from left to right are respectively In−1, In, In+1 and ITOT. More precisely, these images denote blocks of images In−1, In, In+1 and ITOT. Each block of images In−1, In, and In+1 represents a star with a different position and different noise. Indeed, the noise is distributed differently in each block of images In−1, In, In+1. The block of image ITOT corresponds to the block of the image obtained after temporally averaging the blocks of images In−1, In, In+1. We can note that in the block of image ITOT, the noise has not been reduced and in addition there is a duplication of edge from the blocks of images In−1, In, In+1. Indeed, in contrast to the case of FIG. 2, the star is not perfectly co-located in each of the blocks: in the block of image In−1, the star is in the lower left, in the block of image In, the star is slightly to the lower left, and in the block of image In+1 the star is slightly to the upper right. This can be explained by an imperfect motion estimation. As a result, it is possible to deduce that the temporal operation performed on the blocks of images In−1, In, In+1 is not suitable. Indeed, spatial filtering seems more suitable in such case. The use of a filter that allows obtaining a temporally and spatially filtered image thus seems generally more suitable. Indeed, the use of such a filter makes it possible to choose the type of filtering, spatial or temporal, according to the content of a scene in a video sequence. In addition, such a filter also makes it possible to perform both types of filtering, spatial and temporal, in order to combine a temporally filtered image and a spatially filtered image.

The effectiveness of a temporal filter increases with the number of images considered for the filtering. Indeed, as mentioned above, temporal filtering uses the data of past and future images compared to the image that is to be filtered: the current image. Conversely, the speed of execution of such a filter also increases with the number of motion estimation operations performed. Indeed, too many motion estimation operations can significantly reduce the speed of execution of such a filter. This is particularly limiting for filtering done before real-time encoding. In such a situation, there is the risk that the real-time processing of such a video sequence is not achieved.

In the literature, several mechanisms have been implemented at the spatio-temporal filter level in order to overcome the difficulties mentioned above. However, the performance of such mechanisms is debatable. These mechanisms are generally based on the use of a single criterion such as a difference in pixel values or a sum of absolute differences.

A solution proposed by the prior art consists of performing a motion estimation between:
  a current frame at a time t denoted F;
  two past frames at times t−1 and t−2;
  two future frames at times t+1 and t+2.

Block-based motion compensation is then performed to produce four prediction frames F−2, F−1, F1, and F2. A criterion based on a sum of absolute differences is used each time and for each block, thus:
  if the sum of absolute differences is less than a threshold, the prediction for the block follows the estimated motion vector;
  if the sum of absolute differences is greater than the threshold, the prediction is equal to the current block;

A linear combination between the resultant frames $F_{-2}$, $F_{-1}$, $F_1$, and $F_2$ and two frames that are only spatially filtered FSP1 and FSP2 thus provides a resultant frame that corresponds to the filtering of F. However, such a solution has two drawbacks: the temporal filtering is restricted to only four times, and the criterion based on a sum of absolute differences is insufficient for validating or invalidating a temporal match.

Another solution proposed by the prior art is to perform temporal filtering pixel by pixel. For a given pixel "P", the vectors corresponding to the block containing this pixel, as well as to the neighboring blocks, are averaged. This is in order to obtain a vector and therefore a pixel "R" which corresponds to the current pixel in a past image.

Another proposal of the prior art consists of averaging all the pixels corresponding to the current pixel that are given by these vectors in order to obtain pixel "R". The filtered value is then obtained by the following operation O=P−F (P−R). F then denotes a function with the difference between P and R as its input. When this difference is too large, F(P−R) is equal to 0 and therefore O=P. F may also depend on the quantization step if denoising is applied after encoding and decoding. In such a case, the quantization step is determined from the bit stream. However, incorporating a simple difference in pixel value remains a relatively basic temporal protection mechanism. In addition, temporal filtering has limited effectiveness because such filtering is restricted to a single past frame.

In an alternative solution proposed by the prior art, temporal filtering is performed using a single reference image. A correlation criterion allows indicating whether or not there is a correlation between the current image and the reference image. For example, in the case of a scene change, the correlation criterion will indicate that there is no correlation between the current image and the reference image. Therefore, in such a case, temporal filtering is not performed. In the opposite case, a correlation criterion, this time per block, is calculated for each block of the current image. If this criterion indicates little or no correlation, temporal filtering is not performed for this block. In the opposite case, temporal filtering is carried out pixel by pixel, at a strength adapted for each pixel. Despite two levels of protection against temporal errors—at the image level and at the block level—the criteria are only based on a sum of absolute differences. One can see from the above that the effectiveness of such a solution is therefore limited. In addition, only one reference image is used for filtering the current image in order to limit the complexity of the filtering.

The present disclosure improves the situation.

For this purpose, a first aspect of the disclosure relates to a method, implemented by computer means, for processing the noise of a digital video stream comprising a series of successive images, the method comprising:

spatial filtering to denoise a current image $I_n$ of the series in order to obtain a spatially filtered image $S_n$, n being a natural number;

determining a motion vector for each block B of pixels of the image $S_n$, from a single image $S_{n-1}$ which precedes image $S_n$ in the series of digital images;

calculating a confidence index $\alpha_n[B]$ for each block B of image $I_n$, from the motion vector determined for B, where $\alpha_n[B]$ is representative of a temporal correlation between B and the block corresponding to B in image $S_{n-1}$;

constructing a temporal filter from the calculated confidence indices $\alpha_n[B]$ and applying the temporal filter to the current image $I_n$ in order to obtain a temporally filtered image $T_n$;

spatial filtering to denoise the current image $I_n$ of the series in order to obtain a spatially filtered image $D_n$, where $D_n$ can be equal to $S_n$, and obtaining a temporally and spatially filtered image $R_n$ by applying a function combining the temporally filtered image $T_n$ and the spatially filtered image $D_n$.

Thus, several instants are used for filtering an image portion, while performing only one motion estimation per image. Therefore, the efficiency of the temporal filtering is increased without increasing the complexity of the filter. The present disclosure is therefore particularly advantageous for filtering video content before encoding in real time.

According to one embodiment, a block B of the temporally filtered image Tn is written as Tn[B] and is expressed as a linear combination of Tn−1[B*] and In[B] where:

$T_{n-1}[B^*]$ designates the block B* corresponding to block B in the temporally filtered image $T_{n-1}$ In addition, $T_n[B]$ is expressed in the following form:

$$T_n[B] = \alpha_n[B]*T_{n-1}[B^*] + (1-\alpha_n[B])*I_n[B]$$

Thus, the present disclosure proposes progressively constructing a purely temporally filtered image that corresponds to a weighted average of all past images that precede a current image.

In addition, for n=0, the following expression is satisfied for all blocks B of image T0:

$$T_0[B] = I_0[B] \text{ and } \alpha_n[B] = 0$$

According to one embodiment, the confidence index $\alpha n[B]$ is calculated from a parameter P[B] evaluating the correlation between block B of image Dn and block B* of image Dn−1.

Thus, the confidence indices enable verifying the averaging operation performed, according to a plurality of criteria.

According to one embodiment, $0 \leq P[B] \leq 1$ and $0 \leq \alpha n[B] \leq 1$.

In addition, the confidence index $\alpha n[B]$ is expressed as follows:

$$\alpha_n[B] = P[B]*\mathrm{clip}(s + v*\alpha_{n-1}[B^*], 0, 1)$$

$$\text{where clip}(x, \min, \max) = \begin{cases} \min \text{ if } x < \min \\ \max \text{ if } x > \max \\ \text{else } x \end{cases}$$

where:

s denotes an offset;

v a learning speed;

$\alpha_{n-1}[B^*]$ the confidence index of block B* of image $D_{n-1}$.

The expression of $\alpha n[B]$ makes it possible to reinitialize the temporal mean which is currently being determined, if the temporal correlation P[B] is weak. This helps protect the rest of the images from the influence of uncorrelated past images in the final result.

According to one embodiment, the temporally and spatially filtered image Rn is expressed in the form of a linear combination of $T_n[B]$ and $D_n[B]$, where $D_n[B]$ denotes a block B of spatially filtered image Dn.

In addition, the temporally and spatially filtered image Rn is expressed in the following form:

$$R_n[B] = \alpha_n[B]*T_n[B] + (1-\alpha_n[B])*D_n[B]$$

The present disclosure thus makes it possible to benefit effectively from the advantages of the two types of filtering, spatial and temporal.

A second aspect of the disclosure relates to a computer program comprising instructions for implementing the steps of the method according to one of the preceding embodiments, when these instructions are executed by a processor.

A third aspect of the disclosure relates to a device for processing noise in a digital video stream comprising a series of digital images, the device comprising:

a processor configured to perform the following operations:

spatial filtering to denoise a current image $I_n$ of the series in order to obtain a spatially filtered image $S_n$, n being a natural number;

determining a motion vector for each block B of pixels of the image $S_n$, from a single image $S_{n-1}$ which precedes image $S_n$ in the series of digital images;

calculating a confidence index $\alpha_n[B]$ for each block B of image $I_n$, from the motion vector determined for B, where $\alpha_n[B]$ is representative of a temporal correlation between B and the block corresponding to B in image $S_{n-1}$;

constructing a temporal filter from the calculated confidence indices $\alpha_n[B]$ and applying the temporal filter to the current image $I_n$ in order to obtain a temporally filtered image $T_n$;

spatial filtering to denoise the current image $I_n$ of the series in order to obtain a spatially filtered image $D_n$ where $D_n$ can be equal to $S_n$, and obtaining a temporally and spatially filtered image $R_n$ by applying a function combining the temporally filtered image $T_n$ and the spatially filtered image $D_n$.

BRIEF DESCRIPTION OF THE DRAWINGS

Other features and advantages of the disclosure will emerge from the following description, with reference to the appended figures which illustrate an embodiment that is in no way limiting and in which.

DETAILED DESCRIPTION

The present disclosure relates to a spatio-temporal filter for obtaining a temporally and spatially filtered image. Below, the following terms will be considered to be equivalent to each other:
spatial filter and denoising spatial filter;
spatial filtering and denoising spatial filtering;
temporal filter and denoising temporal filter;
temporal filtering and denoising temporal filtering;

The present disclosure can be divided into three major steps: two filtering steps (spatial and temporal) and one step of combining the spatially filtered image and the temporally filtered image.

We will define some notations used in the present description:
$I_n$=current image at time "n",
$D_n$=current image at time "n", spatially denoised with a spatial denoiser or spatial filter "D",
$S_n$=image spatially prefiltered with spatial filter S
$T_n$=temporal map at time "n", and
$R_n$=spatio temporally filtered image The spatial filtering step may consist of using a spatial filter D in order to filter a current image In. In this step, the choice of filter has a certain importance. Indeed, the purpose of this spatial filtering step is to denoise the image while limiting the number of artifacts that the filtering may cause, in other words blur. If the temporal filter subsequently used is not effective, it is important that the spatial filtering step limits the noise as much as possible. This justifies the importance given to the choice of spatial filter. Once the current image In is spatially filtered with a spatial filter D, an image Dn is obtained.

The temporal filtering step can be divided into several sub-steps. For example, a second spatial filter S can be used to spatially filter the current image and thus obtain an image Sn. This sub-step can be optional. Indeed, it is possible to use image Dn spatially filtered using spatial filter D. In such a case, Dn=Sn.

During the temporal filtering step, a motion estimation is performed between images Sn and Sn−1. The result of this motion estimation is a motion vector for each block of the current image Sn. Such a vector makes it possible to estimate the motion of an object within the video sequence, between images Sn and Sn−1.

Figure 1:
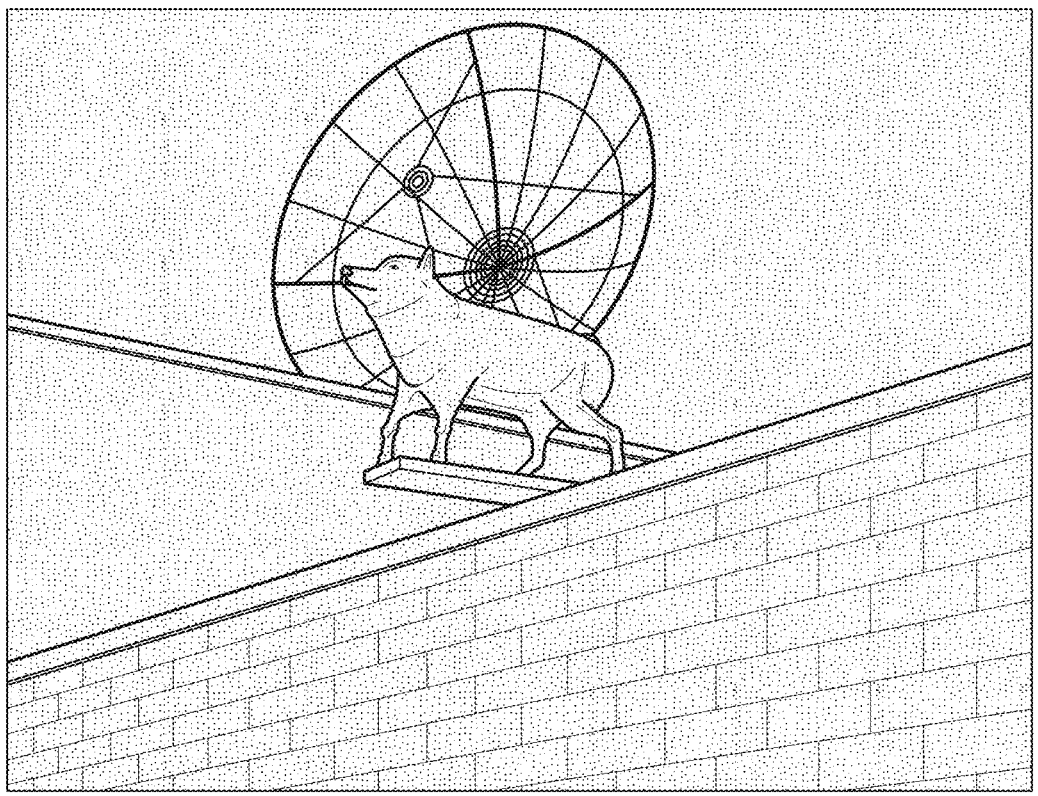
FIG. 1 shows a noisy original image.
Figure 2:
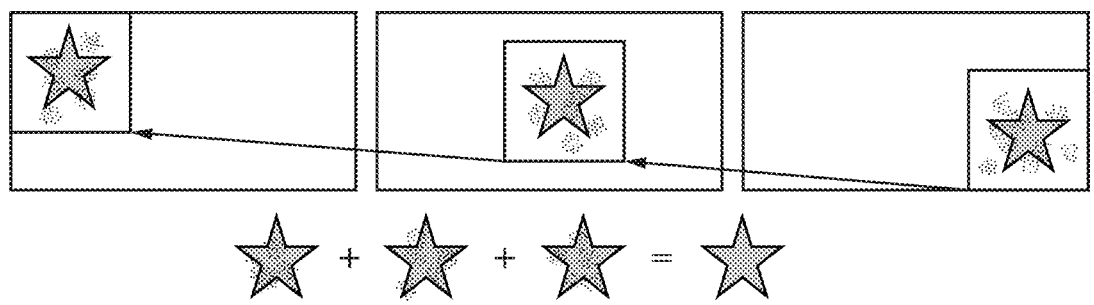
FIG. 2 shows a motion estimation for a translational movement.
Figure 3:
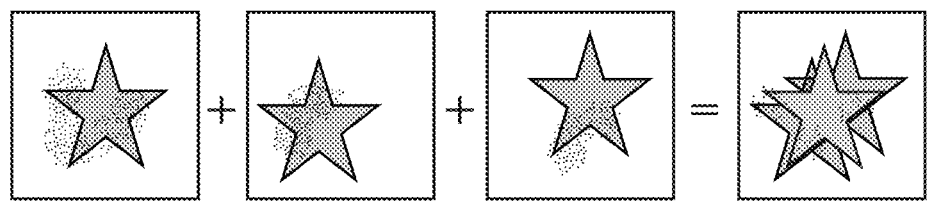
FIG. 3 shows an example of duplicate edges.
Figure 4:
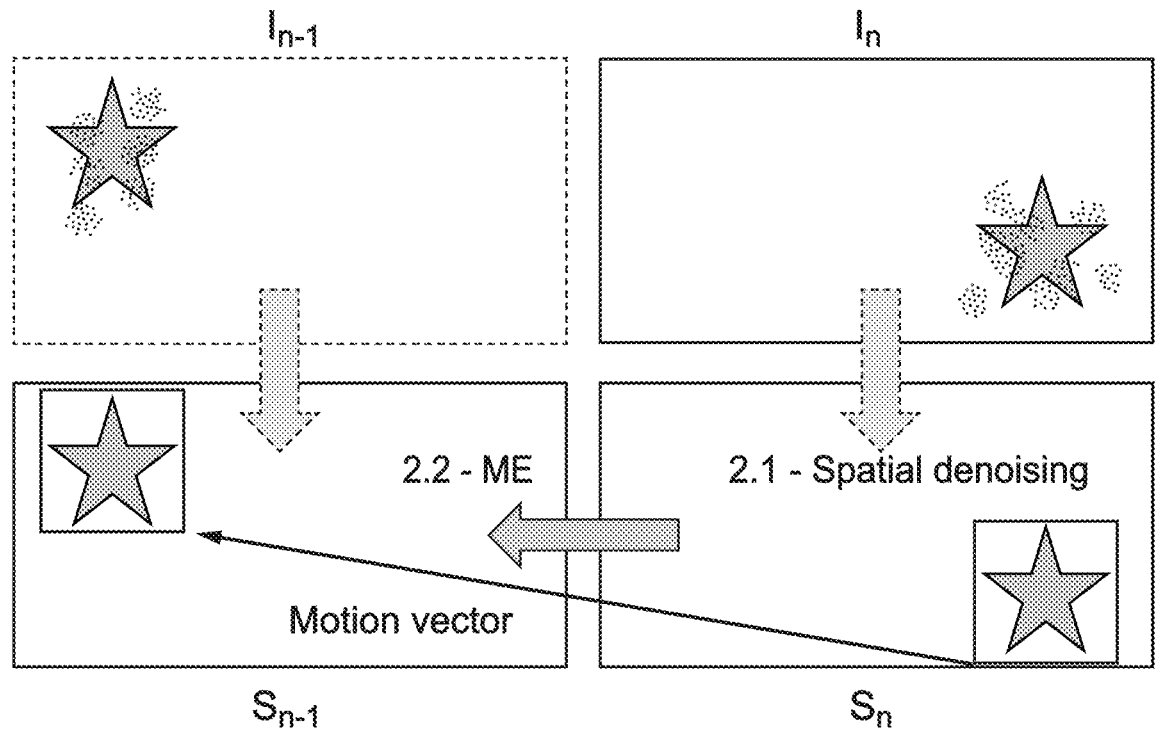
FIG. 4 shows a motion estimation following a spatial filtering.

FIG. 4 represents the obtaining of image Sn from a current image In using a spatial filter S. The current image In located at the top right of FIG. 4 shows content in the form of a star with noise. The application of spatial filter S makes it possible to obtain an image Sn located at the bottom right of FIG. 4, which corresponds to the content of the spatially-denoised image Sn. In the same manner, the application of a spatial filter S to image In−1 located at the top left of FIG. 4 makes it possible to obtain the spatially filtered image Sn−1 located at the bottom left of FIG. 4. The motion estimation is carried out between images Sn−1 and Sn, in other words from spatially denoised images. The vector resulting from image Sn heading towards image Sn−1 corresponds to the motion vector representing the motion of the star-shaped content between the two images Sn and Sn−1. The noise present in the original images In and In−1 can disrupt the motion estimation process. Therefore, it is preferable to filter images In and In−1 spatially before performing the motion estimation. A motion estimation performed on noisy images can lead to obtaining an erroneous motion vector. Thus, the use of a spatial filter on images In and In−1 before the motion estimation reduces noise and makes it possible to obtain a better correspondence between images Sn and Sn−1. The purpose of using a spatial filter S prior to the motion estimation is to eliminate most of the noise. However, it is not essential for the spatially denoised images Sn−1 and Sn to be completely denoised. Therefore, spatial filter S may have a lower complexity than spatial filter D. It may be preferable for spatial filter S to have a higher denoising strength than the denoising strength of spatial filter D, even if a denoiser with a higher denoising strength can impact important details in video content.

Following the motion estimation performed for each block B of the current image, a confidence index αn[B] comprised between 0 and 1 is calculated. We consider B* to be the block corresponding to block B of the current image In, in the previous image In−1 pointed to by the motion vector determined during the motion estimation.

In order to perform temporal filtering, it is possible to build a temporal map Tn. Tn corresponds to a temporally filtered image. Thus, a block B of the temporally filtered image Tn is written Tn[B] and can be expressed as a linear combination of Tn−1[B*] and In[B]. It is then possible to consider the following recurrence relation:

$$T_n[B]=\alpha_n[B]*T_{n-1}[B^*]+(1-\alpha_n[B])*I_n[B]$$

where:
$T_n[B]$ is a block B of the temporally filtered image $T_n$;
$T_{n-1}[B^*]$ is block B* corresponding to block B, in the temporally filtered image $T_{n-1}$;
$\alpha_n[B]$ is a confidence index comprised between 0 and 1;
$I_n[B]$ is block B of current image $I_n$.

The initialization of such a recurrence relation for n=0, in other words for the first image, is:

$$T_0[B]=I_0[B] \text{ and } \alpha_0[B]=0 \text{ for all blocks in the image}$$

The calculation of the confidence index αn[B] for an integer n greater than or equal to 1 can be carried out in two steps:

a weight designated by "P [B]" (0≤P[B]≤1) can be calculated.

The calculation of P[B] can be carried out on the basis of a criterion measuring the correlation between blocks B and B* described above. The purpose of this is to evaluate the motion estimation performed and the relevance of the obtained result, in other words the motion vector.

The confidence index αn[B] can then be calculated with the following formula:

$$\alpha_n[B]=P[B]*clip(s+v*\alpha_{n-1}[B^*],0,1)$$

where:

$$clip(x, min, max) = \begin{cases} min \text{ if } x < min \\ max \text{ if } x > max \\ else\ x \end{cases}$$

"s" is an offset,
"v" is a learning speed (0≤s≤1 and 0≤v≤1).

When all the blocks B of the temporally filtered image Tn, denoted Tn[B], and the associated confidence indices αn[B] have been determined, it is then possible to gather the results obtained by the temporally filtered image Tn and the spatially filtered image Dn.

The combination of the spatially and temporally filtered images Dn and Tn is denoted Rn.

The temporally and spatially filtered image Rn can be expressed in the following form, where n denotes a natural number:

$$R_n[B]=\alpha_n[B]*T_n[B]+(1-\alpha_n[B])*D_n[B]$$

For the first image, in other words for n=0, we have the following relation:

$$R_0[B]=D_0[B]$$

Therefore, the first image is only spatially filtered, using spatial filter D.

Figure 5:
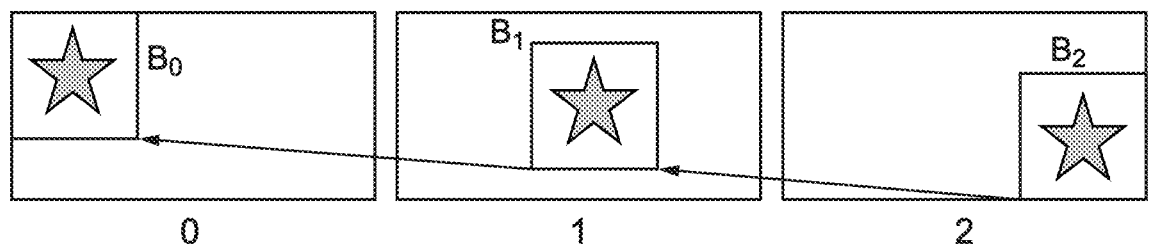
FIG. 5 shows a perfect motion estimate.

FIG. 5 shows a perfect motion estimation. Three images 0, 1 and 2 are shown in FIG. 5. Each image comprises content in the form of a star that moves translationally from image 0 to image 1 and from image 1 to image 2. Each image 0, 1 and 2 respectively comprises a block B0, a block B1 and a block B2.

In this example, the values of the offset s and the learning speed v are equal to 0.5. As the motion estimation is perfect, the temporal correlation is then maximal. P[B] allows measuring the correlation between the blocks. As the correlation is maximal, P[B] is then equal to 1.

For block B1 of image 1, the calculation of the confidence index then provides the result:

$$\alpha_1[B_1]=0.5$$

By replacing the value of the confidence index equal to 0.5 in the expression of Tn, we obtain the following result:

$$T_1[B_1]=0.5*I_0[B_0]+0.5*I_1[B_1]$$

For block B2 of image 2, the calculation of the confidence index is then expressed:

$$\alpha_2[B_2]=0.5+0.5*\alpha_1[B_1]=0.5+0.25=0.75$$

By replacing the value of $\alpha_2[B_2]$ and of $T_1[B_1]$ in the expression of $T_1[B_1]$, we obtain:

$$T_2[B_2]=0.75*T_1[B_1]+0.25*I_2[B_2]=0.375*I_0[B_0]+0.375*I_1[B_1]+0.25*I_2[B_2]$$

From which:

$$T_2[B_2]=0.375*I_0[B_0]+0.375*I_1[B_1]+0.25*I_2[B_2]$$

Therefore, it can be deduced that $T_2[B_2]$ which corresponds to block B2 of the temporally filtered image Tn comprises blocks B0, B1 and B2 of the original images I0, I1 and I2 associated with a coefficient.

Tn seems to correspond to an accumulation of several portions of past images with coefficients which seems to constitute a weighted mean.

The calculation for B3, B4 and B5 provides the following confidence index values:

$$\alpha_3[B_3]=0.875, \alpha_4[B_4]=0.9375, \alpha_5[B_5]=0.96875$$

$\alpha_n[B]$ is comprised between 0 and 1. Therefore, it seems that the higher n is, the more the index of confidence converges to 1, in other words the limit of $\alpha_n[B]$ when n tends to infinity is equal to $$1: \lim_{n\to\infty} \alpha_n = 1$$

However, the temporally and spatially filtered image Rn is expressed in the form:

$$R_n[B]=\alpha_n[B]*T_n[B]+(1-\alpha_n[B])*D_n[B]$$

Therefore, when n tends to infinity in the above equation, we obtain:

$$\lim_{n\to\infty} R_n[B] = 1*T_n[B]+(1-1)*\lim_{n\to\infty} D_n[B]$$

We then have:

$$\lim_{n\to\infty} R_n[B] = T_n[B]$$

Therefore, it is possible to deduce that the larger the n, the less spatial filtering occurs when the motion estimation is efficient.

Figure 6:
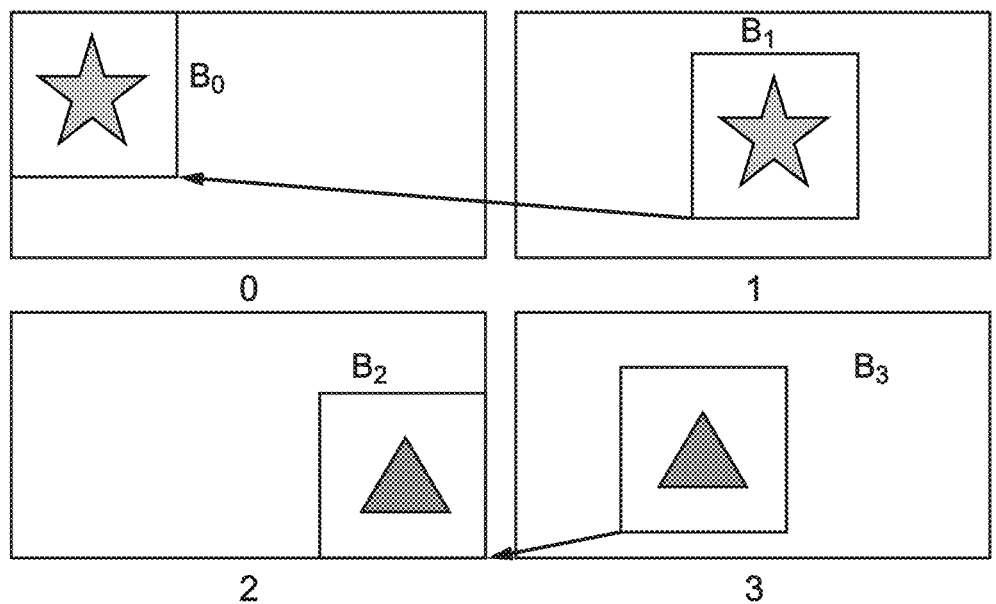
FIG. 6 shows a scene change.

FIG. 6 shows four images: 0, 1, 2 and 3. Each image comprises a respective block B0, B1, B2 and B3. Images 0 and 1 represent the same scene of star-shaped content that moves from image 0 to 1. Images 2 and 3 represent a different scene with different triangle-shaped content which also moves from image 3 to image 2. P[B] makes it possible to measure the correlation between blocks. There is a change of scene starting from image 2 and the correlation is therefore minimal, in other words P=0 for all blocks of image 2. For the other blocks, in other words blocks B0, B1 and B3, the motion estimation is considered to be perfect and consequently the correlation is maximal, P[B] then being equal to 1.

Considering the values of P defined above, the calculation of $\alpha_n[B]$, $T_n[B]$ and Rn[B] then provides:

$$\alpha_1[B_1]=0.5 \to T_1[B_1]=0.5*I_0[B_0]+0.5*I_1[B_1]$$

$$\alpha_2[B_2]=0 \to T_2[B_2]=I_2[B_2] \to R_2[B_2]=D_2[B_2]$$

$$\alpha_3[B_3]=0.5+0.5*\alpha_2[B_2]=0.5$$

$$T_3[B_3]=0.5*T_2[B_2]+0.5*I_3[B_3]=0.5*I_2[B_2]+0.5*I_3[B_3]$$

And thus:

$$T_3[B_3]=0.5*I_2[B_2]+0.5*I_3[B_3]$$

In the expression of $T_3[B_3]$, one might notice that the terms $I_0[B_0]$ and $I_1[B_1]$ do not occur. Therefore, knowing the expression of Rn described above, it is possible to deduce by transitivity that the terms $I_0[B_0]$ and $I_1[B_1]$ do not appear in the expression of $R_3[B_3]$. This can be justified by temporal correlation. Indeed, in FIG. 6, there is a scene change between images 1 and 2. Therefore, the scene represented in images 0 and 1 is completely different from the scene represented in images 2 and 3. Images 0 and 1 therefore cannot be involved in the expression of $T_3[B_3]$ and $R_3[B_3]$. Indeed, no temporal correlation can be exploited with these images. For the temporal filtering of images following a scene change, the previous images therefore cannot be taken into account. In effect, there is no longer any temporal correlation.

Figure 7:
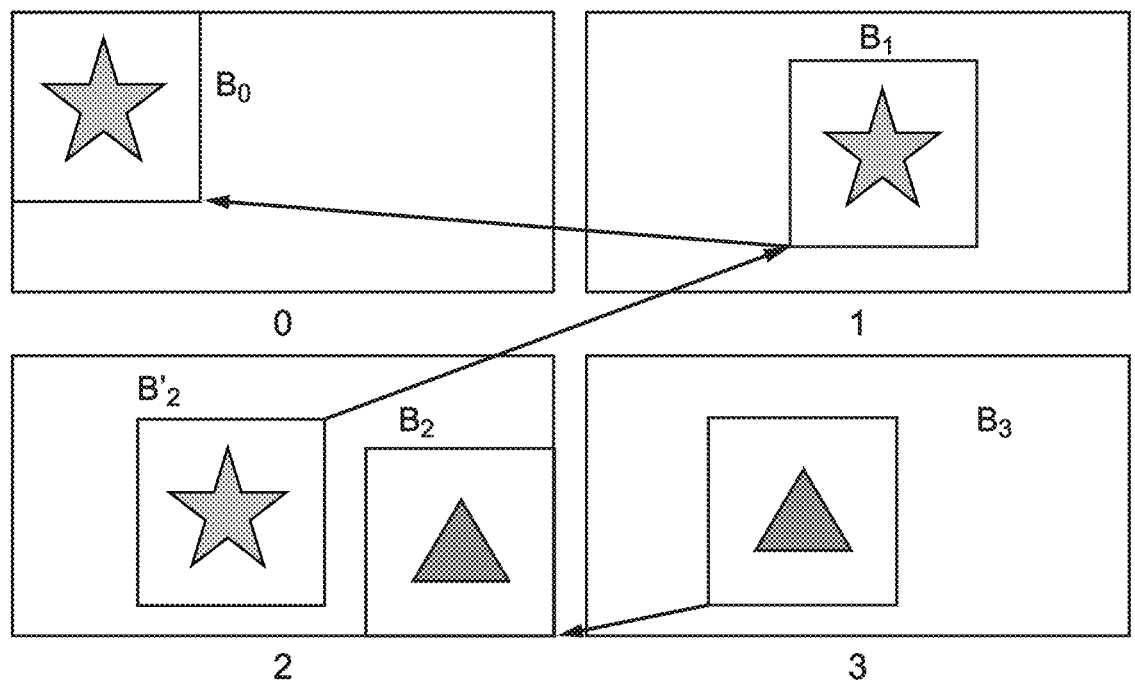
FIG. 7 shows the disocclusion of an object during a change of image.

FIG. 7 shows the disocclusion of an object during an image change FIG. 7 comprises four images 0, 1, 2 and 3. Each image respectively comprises a block B0, a block B1, a block B2 and a block B3. The mechanism of reinitializing the mean corresponding to the calculation of Tn[B] observed in FIG. 6 is more precise. In effect, such a mechanism is applied at a block level of the image, in other words a weight P is calculated for each block of the image. This makes it possible to manage isolated occlusions and disocclusions. The previous example of FIG. 6 illustrated a complete scene change. However, it is possible for an object to be deleted or added from one scene to another. FIG. 7 shows such a situation. During the transition from image 1 to image 2, a triangle-shaped content is added. Conversely, from image 2 to image 3 a star-shaped content is removed. In such a case, the calculation of T2[B2] and T3[B3] is the same as for FIG. 6. On the other hand, for the calculation of T2[B'2] of FIG. 7, we obtain:

$$\alpha_2[B'_2]=0.5+0.5*\alpha_1[B_1]=0.75$$

$$T_2[B'_2]=0.75*T_1[B_1]+0.25*I_2[B'_2]=0.375*I_0[B_0]+0.375*I_1[B_1]+0.25*I_2[B'_2]$$

Figure 8:
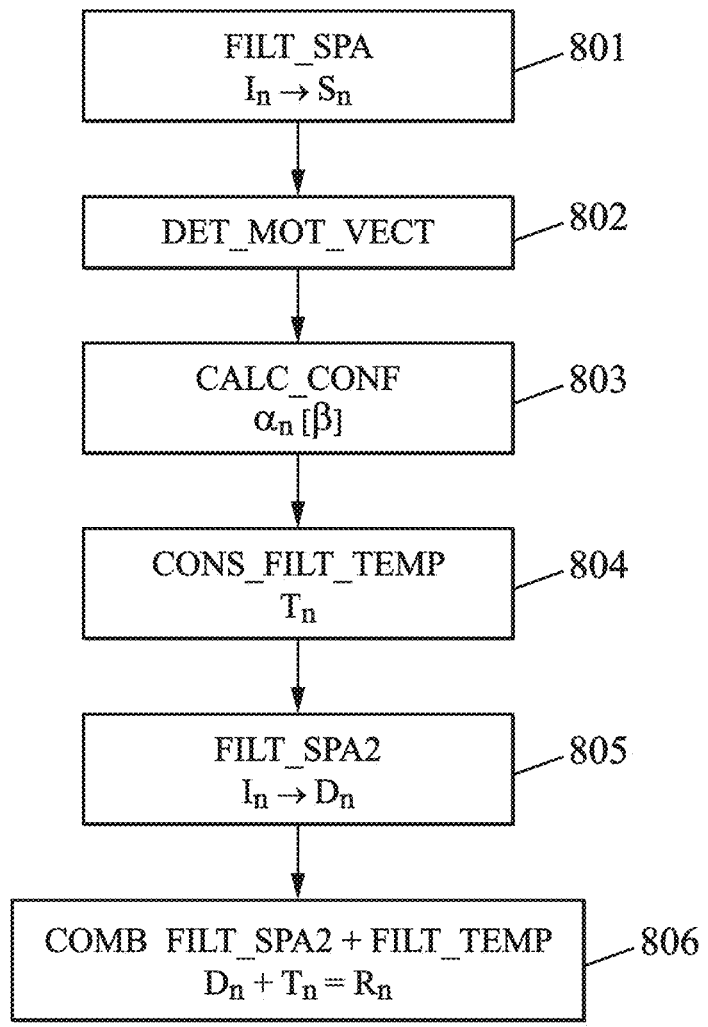
FIG. 8 illustrates steps of the noise processing method according to one embodiment of the disclosure.

FIG. 8 illustrates steps of the noise processing method according to one embodiment of the disclosure. The noise processing is applied to a digital video stream that comprises a series of successive images. In a step FILT_SPA 801, a current image In is spatially filtered using a spatial filter S to obtain a spatially filtered image Sn. Step DET_MOT_VECT 802 is a motion estimation step where a motion vector is determined. Such a step makes it possible to analyze the movement of objects in the digital video stream, by looking for the correlation between two successive images in order to estimate the change of position of the content using a motion vector. The determination of the motion vector is performed for each block B of image Sn. Indeed, as previously stated, in order to increase the relevance of the motion estimation, it is preferable to filter the image spatially first. The determination of the motion vector is performed for each block B of image Sn, from a single image Sn−1. Image Sn−1 is the image preceding image Sn in the series of digital images. In step CALC_CONF 803, a confidence index αn[B] is calculated for each block of the current image In, from the estimated motion vector. Such a calculation has already been described in the present application, in particular with reference to FIG. 4. The confidence index αn[B] represents the temporal correlation between the blocks of image Sn and the blocks of image Sn−1. The temporal filter Tn is constructed in step CONS_FILT_TEMP 804. Such a filter is constructed from the calculated confidence indices αn[B]. Step FILT_SPA2 805 consists of a spatial filtering of the current image In of the series in order to obtain a spatially filtered image Dn where Dn can be equal to Sn. The temporally filtered image Tn obtained is then combined with the spatially filtered image Dn in order to obtain a spatially and temporally filtered image Rn in step COMB FILT_SPA+FILT_TEMP 806. Rn is thus obtained by applying a function combining the temporally filtered image Tn and the spatially filtered image Dn.

We describe here an implementation of the disclosure for one particular embodiment.

For the spatial filtering step, a spatial filter D=an FFT2D spatial denoiser is used with the following set of parameters:

Block size=32, size of overlap=16, strength=4.

This spatial filter D has a moderate complexity and is relatively effective.

In order to maximize the performance of the motion estimation and in particular the determination of the motion vectors for each image block, a spatial filter S is used where S=an FFT2D denoiser. S may be less effective and faster than the first spatial filter D.

The set of parameters is: block size=32, size of overlap=8, strength=16. The denoising strength of the spatial filter S is increased so that the spatial filter S removes as much noise as possible. As explained above, the presence of excessive noise can disrupt the motion estimation and in particular the determination of the motion vectors.

Motion estimation by adjacent blocks of size 16×16 is performed. It should be noted that the blocks do not overlap. All subsequent processing will be carried out in 16×16 blocks.

A weight designated by "P[B]" (0≤P[B]≤1) can be calculated.

The calculation of P[B] (0≤P[B]≤1) is then performed. P[B] makes it possible to measure the correlation between blocks. The aim is to be able to evaluate the motion estimation made.

The set of motion vectors determined during the motion estimation step are provided as input to a scene change detection algorithm.

The result obtained is binary: if a scene change is detected, P=0 for all blocks of the image. Otherwise, for each block B (B* being its corresponding block in the past image):

A sum of absolute differences between B and B* is calculated $$SAD(B, B^*) = \sum_i \sum_j |B_{i,j} - B^*_{i,j}|$$

where: $B_{i,j}$ is the pixel at position (i,j) in block B

The autosad of B is then calculated:

$$autosad(B) = \frac{\sum_i \sum_j |B_{i,j} - B_{i+1,j}| + \sum_i \sum_j |B_{i,j} - B_{i,j+1}|}{2}$$

Finally, P[B] is then calculated by the following formula:

$$P[B] = \text{clip}\left(1 - \frac{SAD}{2000}, 0, 1\right) * \text{clip}\left(3 - \frac{SAD}{autosad}, 0, 1\right)$$

As detailed above, in particular with reference to FIG. 8, the spatial filters D and S may be the same or different. The same spatial filter can be used with a different set of parameters. Examples of spatial filters: Gaussian filter, FFT2D, FFT3D Filter with a purely spatial mode, mean filter, or bilateral filter.

The blocks B of the abovementioned images can be adjacent to each other during the motion estimation, the calculation of P[B], of αn[B], of Tn[B], and of Rn[B]. However, the blocks B of the images can also overlap to avoid visible block edge artifacts. It is possible to subdivide the blocks in different ways.

The confidence index has been defined as follows:

$$\alpha_n[B] = P[B] * \text{clip}(s + v * \alpha_{n-1}[B^*], 0, 1)$$

The factor "s" (0≤s≤1) defined as an offset corresponds to the initial weight associated in the past for the temporal filtering operation.

The factor "v" (0≤v≤1)) defined as the learning speed represents the rate of increase of the weight s over time.

The following table shows, for different combinations (s, v), an example weight for the first ten images in the case of a perfect motion estimation, in other words where P=1 as described in FIG. 5 for example. It is therefore possible to adapt these parameters according to the desired application.

|          | s = 0.5 and v = 0.5 | s = 0.5 and v = 0.8 | s = 0.2 and v = 0.8 |
|----------|---------------------|---------------------|---------------------|
| Image 1  | 0.500000            | 0.500000            | 0.200000            |
| Image 2  | 0.750000            | 0.900000            | 0.360000            |
| Image 3  | 0.875000            | 1.000000            | 0.488000            |
| Image 4  | 0.937500            | 1.000000            | 0.590400            |
| Image 5  | 0.968750            | 1.000000            | 0.672320            |
| Image 6  | 0.984375            | 1.000000            | 0.737856            |
| Image 7  | 0.992188            | 1.000000            | 0.790285            |
| Image 8  | 0.996094            | 1.000000            | 0.832228            |
| Image 9  | 0.998047            | 1.000000            | 0.865782            |
| Image 10 | 0.999023            | 1.000000            | 0.892626            |

The calculation of P[B] can be done from a criterion which allows measuring the correlation between blocks B. This is in order to evaluate the precision of the motion vector obtained following the motion estimation. The criteria for calculating P[B] are, for example, the sum of absolute differences, the ratio of the sum of absolute differences to the autosad, or the coherence of the motion vector fields.

Figure 9:
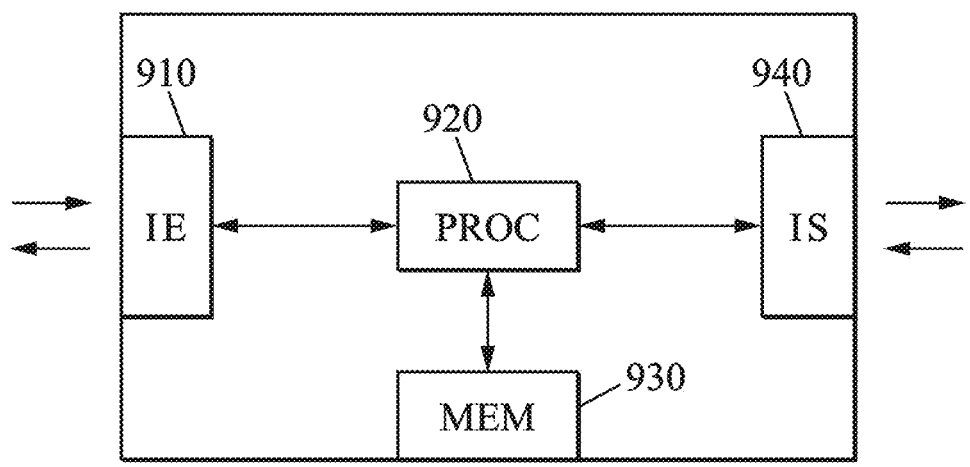
FIG. 9 illustrates a device according to one embodiment of the disclosure.

The disclosure can be implemented by a computer device, as illustrated by way of example in FIG. 9, which comprises a processing circuit including:

an input interface 910, for receiving the image data to be processed, a processor 920 cooperating with a memory 930, for processing the image data received, and an output interface 940 for delivering the image data processed by implementing the above method.

The aforementioned memory 930 can typically store instruction code of the computer program within the meaning of the disclosure (an example flowchart for this is shown in FIG. 8, commented above). This instruction code can be read by the processor 920 in order to execute the method according to the disclosure. The device may further comprise a working memory (separate or identical to memory 930) for storing temporary data, in particular the calculated interest metrics.

The disclosure is not limited to the exemplary embodiments described above by way of example only, but encompasses all variants conceivable to those skilled in the art within the scope of the claims below. For example, the disclosure is not limited to the use of one or two interest metrics as described in the above embodiments.

The invention claimed is:

1. A method, implemented by computer means, for processing the noise of a digital video stream comprising a series of successive images, the method comprising:

spatial filtering to denoise a current image $I_n$ of the series in order to obtain a spatially filtered image $S_n$, n being a natural number;

determining a motion vector for each block B of pixels of the image $S_n$, from a single image $S_{n-1}$ which precedes image $S_n$ in the series of digital images;

calculating a confidence index $\alpha_n[B]$ for each block B of image $I_n$, from the motion vector determined for B, where $\alpha_n[B]$ is representative of a temporal correlation between B and the block corresponding to B in image $S_{n-1}$;

constructing a temporal filter from the calculated confidence indices $\alpha_n[B]$ and applying the temporal filter to the current image $I_n$ in order to obtain a temporally filtered image $T_n$;

spatial filtering to denoise the current image $I_n$ of the series in order to obtain a spatially filtered image $D_n$ where $D_n$ can be equal to $S_n$, obtaining a temporally and spatially filtered image $R_n$ by applying a function combining the temporally filtered image $T_n$ and the spatially filtered image $D_n$, wherein the confidence index $\alpha_n[B]$ is calculated from a parameter P[B] evaluating the correlation between block B of image $D_n$ and block B* of image $D_{n-1}$, and wherein the confidence index $\alpha_n[B]$ is expressed as follows:

$$\alpha_n[B] = P[B] * \text{clip}(s + v * \alpha_{n-1}[B^*], 0, 1)$$

$$\text{with clip}(x, \min, \max) = \begin{cases} \min \text{ if } x < \min \\ \max \text{ if } x > \max \\ \text{else } x \end{cases}$$

where:

s denotes an offset v a learning speed $\alpha_{n-1}[B^*]$ the confidence index of block B* of image $S_{n-1}$.

2. The method according to claim 1, wherein a block B of the temporally filtered image $T_n$ is written as $T_n[B]$ and is expressed as a linear combination of $T_{n-1}[B^*]$ and $I_n[B]$ where:

$T_{n-1}[B^*]$ designates the block B* corresponding to block B in the temporally filtered image $T_{n-1}$.

3. The method according to claim 2, wherein $T_n[B]$ is expressed in the following form:

$$T_n[B] = \alpha_n[B] * T_{n-1}[B^*] + (1 - \alpha_n[B]) * I_n[B].$$

4. The method according to claim 3, wherein for n=0, the following expression is satisfied for all blocks B of image $T_0$:

$$T_0[B] = I_0[B] \text{ and } \alpha_0[B] = 0.$$

5. The method according to claim 1, wherein $0 \leq P[B] \leq 1$ and $0 \leq \alpha_n[B] \leq 1$.

6. The method according to claim 1, wherein the temporally and spatially filtered image $R_n$ is expressed in the form of a linear combination of $T_n[B]$ and $D_n[B]$, where $D_n[B]$ denotes a block B of spatially filtered image $D_n$.

7. The method according to claim 6, wherein the temporally and spatially filtered image $R_n$ is expressed in the following form:

$$R_n[B] = \alpha_n[B] * T_n[B] + (1 - \alpha_n[B]) * D_n[B].$$

8. A non-transitory, computer-readable medium having stored thereon computer-executable instructions for carrying out the method of claim 1.

9. A device for processing noise in a digital video stream comprising a series of digital images, the device comprising:
- a processor configured to perform the following operations:
    - spatial filtering to denoise a current image $I_n$ of the series in order to obtain a spatially filtered image $S_n$, n being a natural number;
    - determining a motion vector for each block B of pixels of the image $S_n$, from a single image $S_{n-1}$ which precedes image $S_n$ in the series of digital images;
    - calculating a confidence index $\alpha_n[B]$ for each block B of image $I_n$, from the motion vector determined for B, where $\alpha_n[B]$ is representative of a temporal correlation between B and the block corresponding to B in image $S_{n-1}$;
    - constructing a temporal filter from the calculated confidence indices $\alpha_n[B]$ and applying the temporal filter to the current image $I_n$ in order to obtain a temporally filtered image $T_n$;
    - spatial filtering to denoise the current image $I_n$ of the series in order to obtain a spatially filtered image $D_n$ where $D_n$ can be equal to $S_n$;
- obtaining a temporally and spatially filtered image $R_n$ by applying a function combining the temporally filtered image $T_n$ and the spatially filtered image $D_n$,
    - wherein the confidence index $\alpha_n[B]$ is calculated from a parameter $P[B]$ evaluating the correlation between block B of image $D_n$ and block $B^*$ of image $D_{n-1}$, and
    - wherein the confidence index $\alpha_n[B]$ is expressed as follows:

$$\alpha_n[B] = P[B] * \operatorname{clip}(s + v * \alpha_{n-1}[B^*], 0, 1)$$

$$\text{with } \operatorname{clip}(x, \min, \max) = \begin{cases} \min & \text{if } x < \min \\ \max & \text{if } x > \max \\ \text{else } x \end{cases}$$

where:
- s denotes an offset
- v a learning speed
- $\alpha_{n-1}[B^*]$ the confidence index of block $B^*$ of image $S_{n-1}$.

* * * * *